United States Patent

[11] 3,611,357

[72] Inventor Henry J. Boulanger
Cumberland, R.I.

[21] Appl. No. 19,895
[22] Filed Mar. 16, 1970
[45] Patented Oct. 5, 1971
[73] Assignee Texas Instruments Incorporated
Dallas, Tex.

[54] PUSHBUTTON KEYBOARD ASSEMBLY
22 Claims, 35 Drawing Figs.

[52] U.S. Cl. 340/365, 178/17 C, 235/145 R
[51] Int. Cl. G06f 3/02
[50] Field of Search 340/365; 178/17 R, 17 C; 235/145 R, 145 A, 146

[56] References Cited
UNITED STATES PATENTS

| | | | |
|---|---|---|---|
| 3,226,712 | 12/1965 | Lens et al. | 340/365 |
| 3,394,368 | 7/1968 | Carr et al. | 340/365 |

*Primary Examiner*—Robert L. Richardson
*Attorneys*—Harold Levine, Edward J. Connors, Jr., John A. Haug, James P. McAndrews and Gerald B. Epstein

ABSTRACT: A pushbutton keyboard assembly includes a plurality of pushbuttons and a stack array of slider plates each having a plurality of apertures, the apertures in each of the plates having a corresponding aperture in each of the other plates. Aperture centering means is associated with each of the pushbuttons and extends through one aperture in each of the plates. Each of the centering means is operative in response to actuation of the associated pushbutton for causing centering of the aperture through which it extends. The plates each have a retracted position in which preselected ones of the apertures are offcenter with respect to the respective centering means extending therethrough, the remaining apertures being centered with respect to their centering means. The plates are slidable from a retracted position to an extended position in response to centering of an aperture by a respective centering means, and means such as an electrical switch associated with each of the plates is responsive to movement of the plate to the extended position for indicating such sliding movement and thereby providing a discrete encoded indication of the actuation of each respective pushbutton.

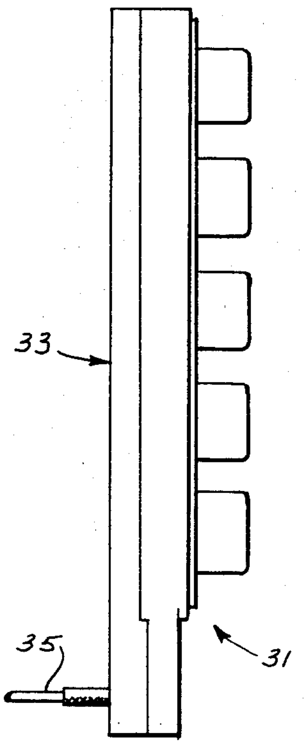
FIG. 2
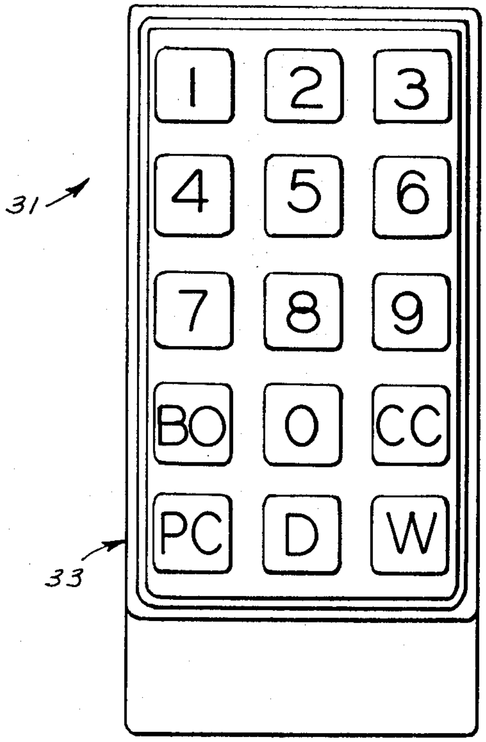
FIG. 1
| BUTTON DEPRESSED | BINARY SWITCHES | | | | STROBE SWITCHES | |
|---|---|---|---|---|---|---|
| | A | B | C | D | E | F |
| 1 | | | | X | | X |
| 2 | | | X | | | X |
| 3 | | | X | X | | X |
| 4 | | X | | | | X |
| 5 | | X | | X | | X |
| 6 | | X | X | | | X |
| 7 | | X | X | X | | X |
| 8 | X | | | | | X |
| 9 | X | | | X | | X |
| 0 | | | | | | X |
| D | | | | X | X | |
| W | | | X | | X | |
| BO | | | X | X | X | |
| PC | | X | | X | X | |
| CC | | X | X | | X | |
FIG. 20
*Henry Boulanger,*
*Inventor.*

PUSHBUTTON KEYBOARD ASSEMBLY

This invention relates to selector keyboards and more particularly to a pushbutton keyboard assembly having a number of pushbuttons and providing a discrete encoded indication of actuation of each respective pushbutton.

With the rapidly increasing use of computers over the past several years, there has been a corresponding increase in the use and development of keyboards which are utilized as devices for providing encoded data input to computers, computer related equipment, and the like. In the design of prior art keyboards, approaches have, broadly speaking, been either electronic or electromechanical. Electronic keyboard designs have frequently been disadvantageous in tending toward undesirable complication as in requiring, for example, auxiliary equipment such as oscillators, amplifiers, or more recently, integrated circuitry. Further, electronic keyboard assemblies have sometimes not been highly reliable due to their complicated nature or have not been immune to environmental extremes. Further, they are typically expensive.

On the other hand, keyboard assemblies which are electromechanical in nature are generally bulky and otherwise larger in size or else may not be reliable. Electromechanical keyboards may require encoding circuitry which may be disadvantageous in requiring a large number of components and complicated wiring interconnections.

Accordingly, among the several objects of the invention may be noted the provision of a pushbutton keyboard assembly; the provision of such a pushbutton keyboard providing an encoded indication of the actuation of the pushbuttons; the provision of such a keyboard particularly useful for providing an encoded input for computers, computer-related equipment, or the like; the provision of such a keyboard in which the pushbuttons are mechanically interlocked to prevent erroneous simultaneous generation of codes associated with different pushbuttons; the provision of such a keyboard providing tactile snap-action feedback for the user; the provision of such a keyboard which is compact in size and provides a relatively low profile in cross section; the provision of such a keyboard which is highly rugged, which is relatively immune to environmental extremes, and which is highly reliable and not prone to failure in operation; and the provision of such an assembly which is relatively simple in construction. Other objects and features will be in part apparent and in part pointed out hereinafter.

Briefly, a pushbutton keyboard assembly of the present invention includes a plurality of pushbuttons with each of which is associated a respective means for expanding in response to actuation of the respective pushbutton along an axis generally perpendicular to the direction of movement of the pushbutton when actuated. A stack array of slider plates is provided, each lying in a plane generally perpendicular to the direction of movement of the pushbutton when actuated. Each of the plates includes a plurality of apertures, with each expander means extending through one of the apertures position in each of the plates. Each plate has a retracted position which preselected ones of the apertures are eccentric with respect to the respective expander means, the eccentricity being along the expansion axis. The remaining apertures are each concentric with respect to the respective expander means. The slider plates are each guided for sliding movement along the expansion axis from a retracted position to an extended position. Actuation of an individual pushbutton causes centering of eccentric apertures by expansion of the respective expander means, causing sliding movement to the extended position of slider plates having an aperture eccentric with respect to the expander means associated with the individual pushbutton. Expansion of the respective expander means also prevents sliding movement of any of the plates having an aperture concentric with respect to the expander means associated with the individual pushbutton. Means responsive to sliding movement of each of the slider plates to the extended position is provided for indicating this sliding movement and thereby providing a discrete encoded indication of the actuation of each of the pushbuttons.

In one embodiment of the invention having pushbuttons arranged in columns and rows, the means responsive to sliding movement is constituted by a sensitive snap-action switch associated with each of the slider plates. In another embodiment having a single column of pushbuttons, the means responsive to sliding movement of the slider plates is constituted by a character mask and light source arrangement wherein light is directed through character segments of the character mask when the respective plate is in its extended position, the segments through which the light is directed defining a character represented by each of the pushbuttons.

The invention accordingly comprises the constructions hereinafter described, the scope of the invention being indicated in the following claims.

In the accompanying drawings, in which two of various possible embodiments of the invention are illustrated, FIGS. 1 and 2 are top and side elevations, respectively, of a first embodiment of a pushbutton keyboard assembly of the invention;

Figure 3:
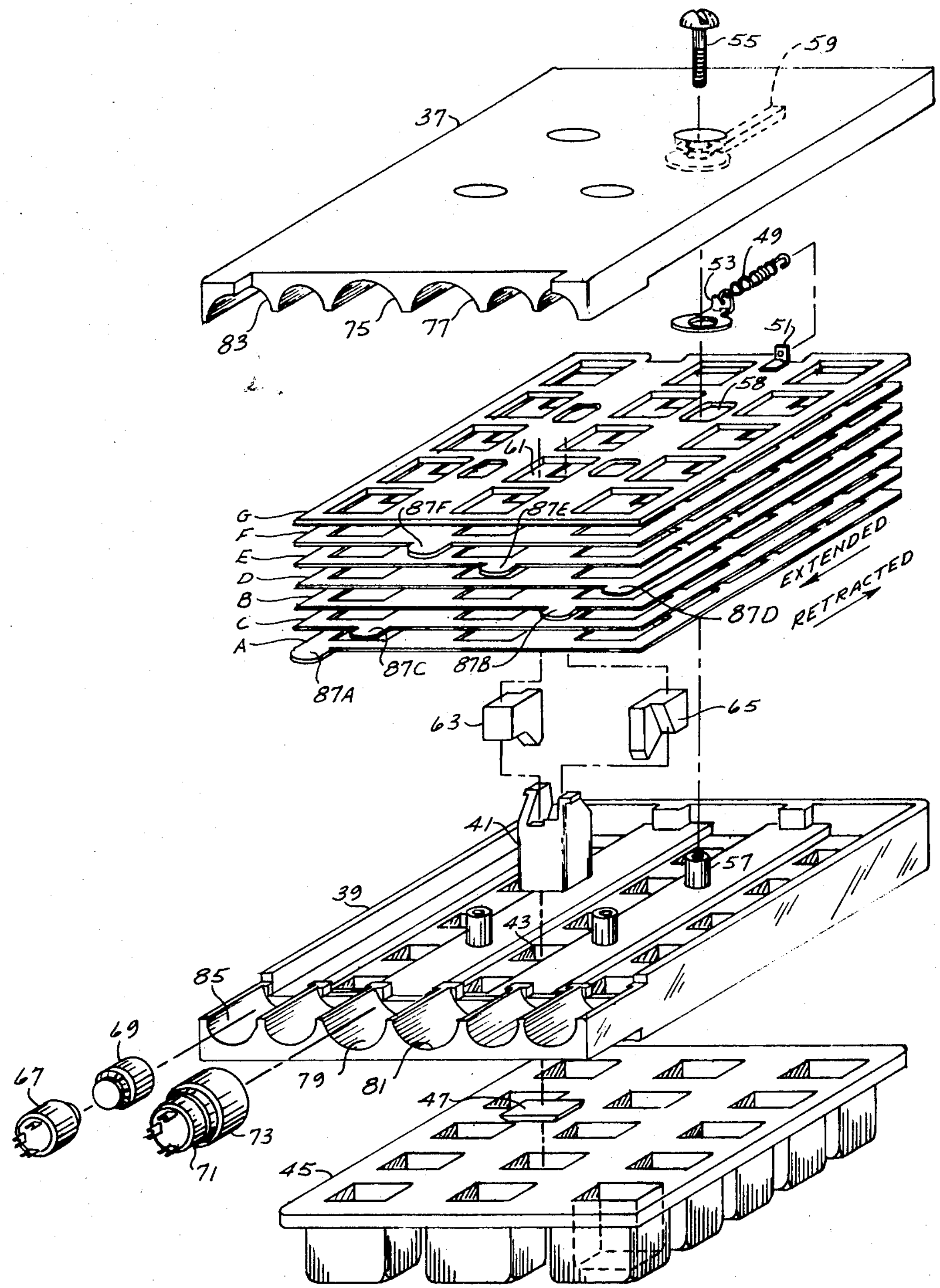
FIG. 3 is an exploded perspective of the FIG. 1 keyboard embodiment.
Figure 4C:
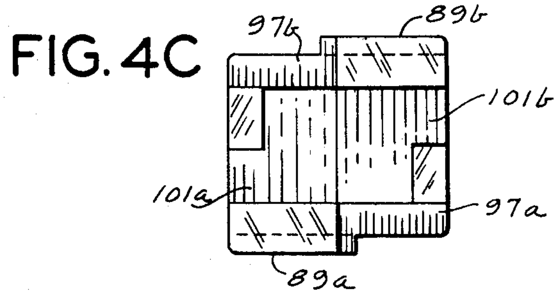
FIGS. 4A–4C are side, end and top elevations, respectively, of a pushbutton of the FIG. 3 exploded assembly.
Figure 4B:
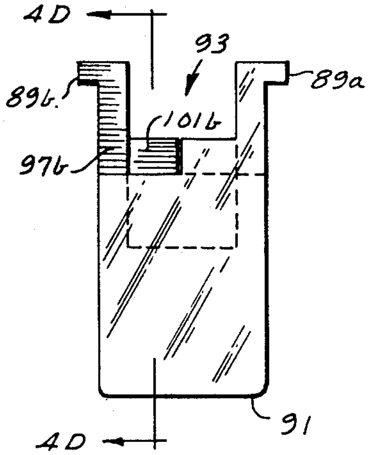
Figure 4A:
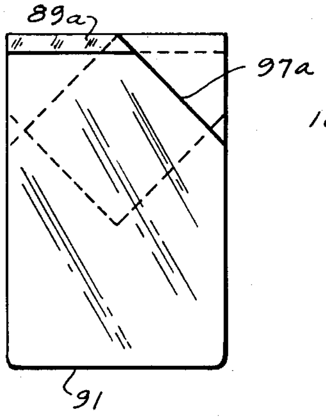
Figure 4D:
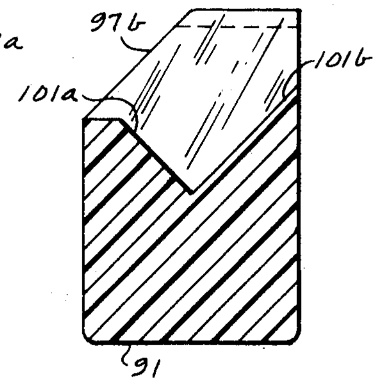
FIG. 4D is a cross section taken along lines 4D—4D of FIG. 4B.
Figure 15:
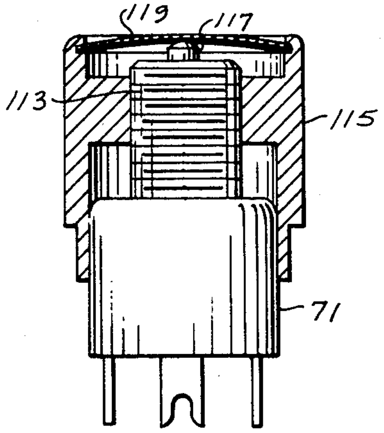
Figure 16:
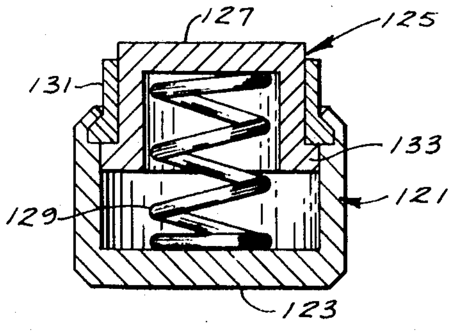
Figure 17:
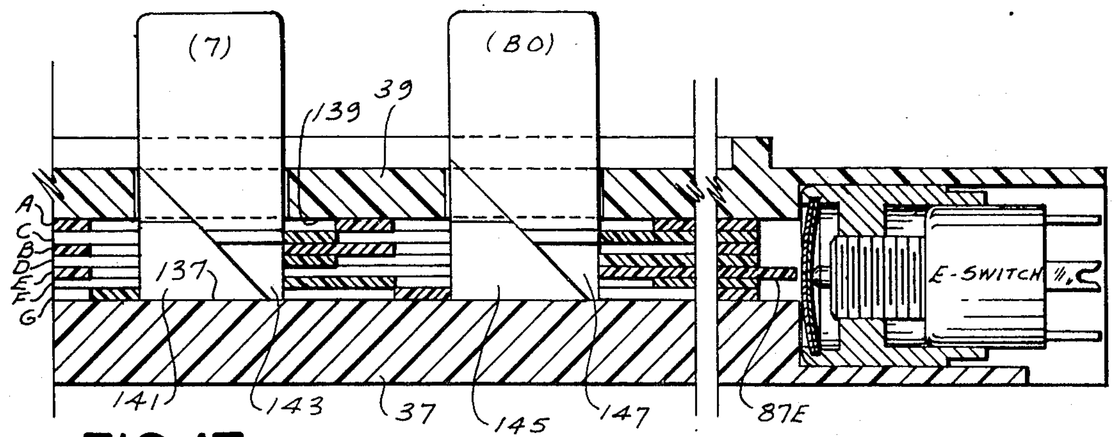
Figure 18:
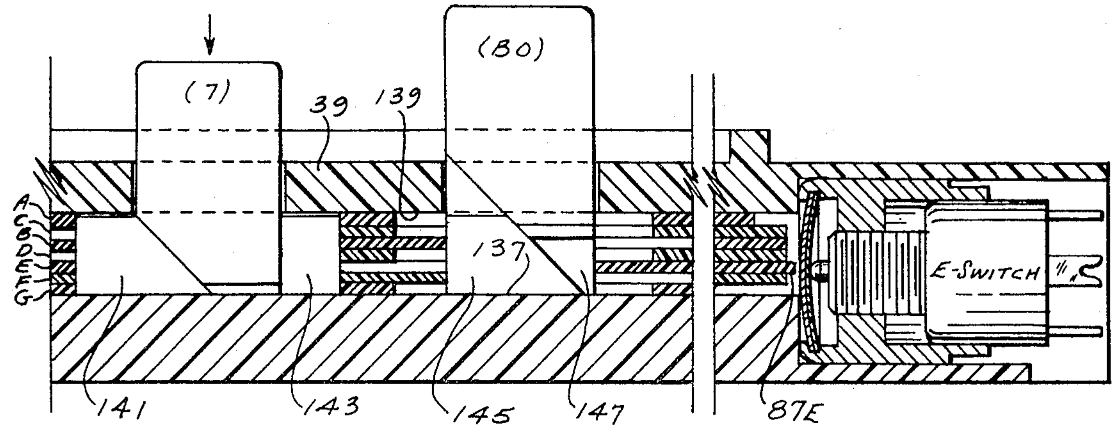
Figure 19:
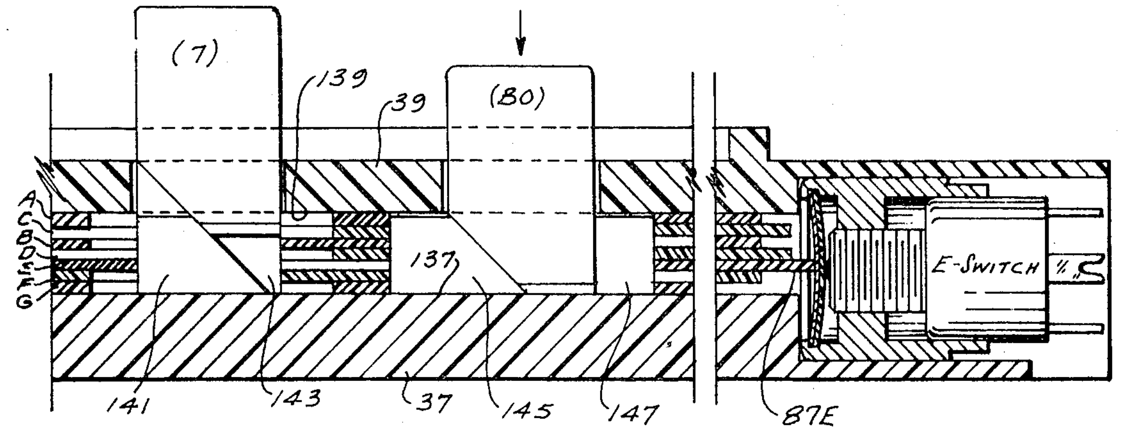
Figures 21, 22, 23:
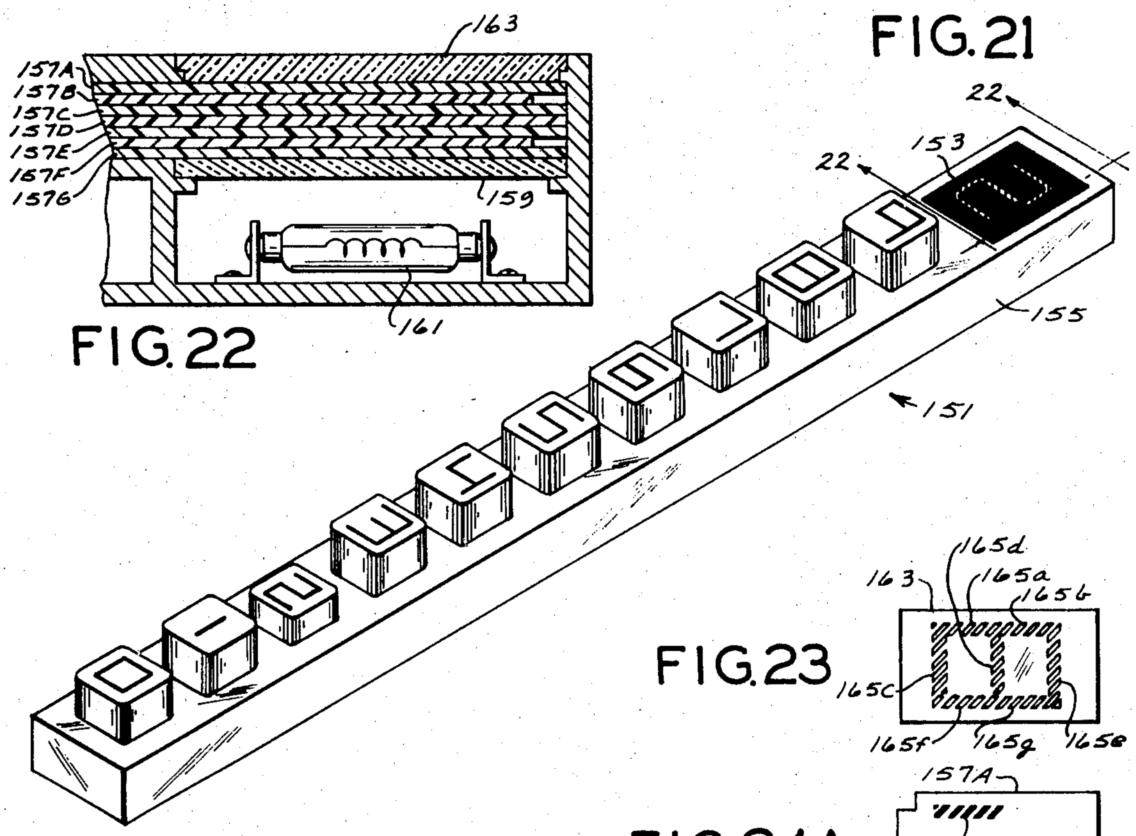
Figure 24A:
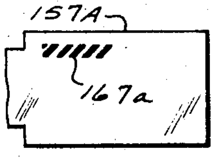
Figure 24B:
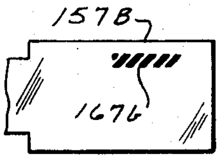
Figure 24C:
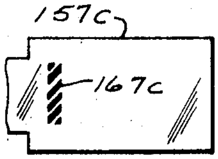
Figure 24D:
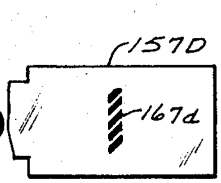
Figure 24E:
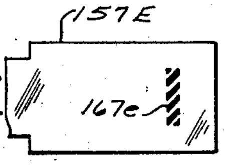
Figure 24F:
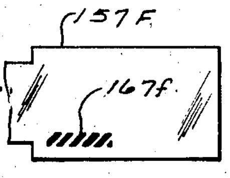
Figure 24G:
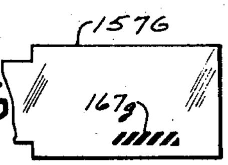

FIG. 8—14 are plan views of slider plates of the invention depicted in FIG. 3;

FIG. 15 is a view, partly in cross section, of a certain strobe switch assembly of the invention;

FIG. 16 is a cross section of a certain overtravel mechanism of the invention;

FIGS. 17–19 are cross sections of the FIG. 1 keyboard assembly taken through a pair of pushbutton-and-cam assemblies and through a certain strobe switch of the keyboard assembly which illustrate the sequence of operation of the keyboard assembly as the pushbuttons are depressed;

FIG. 20 is a table indicating the actuation of switches of the FIG. 1 keyboard assembly corresponding to the actuation of pushbuttons;

FIG. 21 is a perspective of a second embodiment of the invention in which a character is visually indicated which is representative of each of the pushbuttons FIG. 22 is a cross section taken along line 22—22 of FIG. 20;

FIG. 23 is a certain character mask utilized in FIG. 21 embodiment; and

FIGS. 24A–24G are portions of certain slider plates of the latter embodiment.

Corresponding reference characters indicate corresponding parts throughout the several views of the drawings.

Referring now to FIG. 1, illustrated generally at 31 is a first embodiment of an encoding pushbutton selector keyboard of the present invention having pushbutton selectors arranged in three columns and five rows. The pushbuttons, totaling fifteen in number, are designated with numerals 1–0 and with letters BO, CC, PC, D, W which typify several of various characters which it may be desired to use.

The pushbuttons of keyboard 31 protrude from the generally rectangular top or front surface of an enclosure generally indicated at 33 which, as seen in FIG. 3, is relatively thin and low in profile, having only slightly greater thickness than the distance which the pushbuttons protrude. When depressed, each of the pushbuttons is movable into the enclosure (into the sheet as viewed in FIG. 1) from a retracted to an operative position and when released, returns to the retracted position shown in FIGS. 1 and 2. A number of leads such as indicated at 35 protrude from the bottom or rear surface of the keyboard. In one practical construction of the keyboard, enclosure 33 was approximately 5 inches in length, 2½ inches in width, and the overall thickness of the keyboard was slightly less than 1 inch.

Referring now to the exploded view of FIG. 3, keyboard 31 is shown disassembled in an inverted position for clarity of illustration. Enclosure 33 has a lower enclosure half 37 and an upper enclosure half 39. The pushbuttons are identical and extend through identical rectangular apertures in the upper enclosure half. To simplify illustration, only one such pushbutton, designated 41, is shown and ordinarily extends through its aperture 43 as illustrated by broken lines. A gasket or rubber boot 45, preferably of semitransparent neoprene rubber and molded to the shape of the pushbuttons, overlies the front surface of upper enclosure half 39 where it is cemented in position to prevent environmental contamination of the keyboard, as by moisture. Preferably, thin rectangular button inserts such as shown at 47 carry appropriate indicia for identifying the pushbuttons. These inserts may be of engraved plastic and are simply positioned as indicated between the pushbutton and boot 45 where they are clearly visible from the front of the keyboard.

A stack array of six slider plates, each lying one atop the other in sliding face-to-face relationship in a plane generally perpendicular to the movement of the pushbuttons when the latter are actuated, i.e., depressed, are designated A through F. Each is guided by the interior side edges of the upper and lower enclosure halves for sliding movement between a retracted position toward the rear in FIG. 3 and an extended or operative position toward the front in FIG. 3 for the purpose of actuating certain switches to be described. Such sliding movement is indicated by arrows with legends. In addition, a further plate G or so-called preload plate is also provided. For a purpose described hereinbelow, plate G is also slidable along the same directions as plates A–F and is urged in the direction of the extended position of plates A–F by a tension spring 49 extending between a tab 51 at the edge of plate G and a tab 53 having a hole through which one screw 55 of four such assembly screws passes when the keyboard is assembled. Upper enclosure half 39 includes four threaded posts such as that indicated at 57 for receiving the assembly screws to secure together the upper and lower enclosure halves. Such screws pass through small apertures in each of the plates, the aperture for screw 55 being shown at 58. Such apertures are of sufficient size to avoid interference with sliding movement of the plates.

Plates A–G, it should be noted, are preferably of epoxy-bonded glass fiber construction and may be coated with a low-friction material to facilitate sliding movement. Enclosure halves 37 and 39 are preferably of a synthetic resin material such as Bakelite. Except for certain channels at one end toward the front of FIG. 3, lower enclosure half 37 preferably has a smooth, flat interior surface (not visible in FIG. 3) against which plate G bears in sliding relationship and preferably is coated with a thin layer of low-friction material such as Teflon tape. A suitable channel is located on the interior surface of lower enclosure half 37 for receiving spring 49 to avoid interference. This channel is indicated by dashed lines at 59.

Each of plates A–G includes a plurality of apertures, each aperture in each one of the plates having a corresponding aperture in each one of the plates. As FIG. 3 illustrates, these apertures are generally rectangular. One of these apertures is indicated at 61.

Associated with each of the pushbuttons is an expander means for expanding, in response to actuation of the respective pushbutton, to a predetermined dimension along an axis generally perpendicular to the direction of movement of the pushbuttons were depressed. Sliding movement of slider plates A–F is along this expansion axis, i.e., generally parallel thereto. The expander means is constituted by a pair of cams, e.g., cams 63 and 65, each of which rides on an inclined surface of the pushbutton associated therewith. While more specifically described hereinbelow, generally speaking, the cams are forced along the inclined surfaces in opposite directions and thus expand or are cammed outwardly from the axis of movement of the pushbuttons when depressed. Each pair of cams extends through an aperture in each of plates A–G and there is thus a set of apertures for each pair of cams, i.e., for each pushbutton-and-cam assembly, comprising an aperture in each plate.

The shaping and disposition of the apertures is such that, when the slider plates are in the retracted position, preselected ones of the apertures are offcenter or eccentric with respect to the pair of cams of individual pushbutton-and-cam assemblies, while the remaining apertures are concentric, i.e., centered with respect to the cams extending therethrough.

While the pushbutton-and-can assembly and the individual slider plates are explained in much greater detail below, it is presently sufficient to note merely that when a pushbutton is depressed, causing the cams associated therewith to be cammed outwardly and thus causing any aperture through which the cams extend to be centered by engagement of the cams against the edges of the apertures, any aperture which is offcenter or eccentric with respect to the pair of cams will be centered by the action of the cams, which thus act as individual pusher means for effecting pushing of a slider plate with an eccentric aperture from its retracted to its operative or extended position.

On the other hand, if an aperture is concentric with respect to the cams therethrough, depression of the pushbutton with which the latter cams are associated will act merely to lock the slider plate having such a concentric aperture into retracted position and accordingly prevent sliding movement of that plate. As will be more easily understood from the description which follows, this has the effect of making the keyboard interlocking, i.e., when one pushbutton is depressed, actuation of the others is prevented.

The present keyboard embodiment is binary encoding, meaning that actuation of the individual pushbuttons generates a discrete binary code for each pushbutton. For this purpose, electrical switches constitute means responsive to sliding movement of each of plates A–F to the extended position for indicating such sliding movement and thereby provide a discrete binary encoded indication of the actuation of each respective pushbutton. While FIG. 3 depicts only two switches, there are actually six switches, one for each of plates A–F, each of which is actuated by movement of the respective plate to its extended position.

Of the six switches, four constitute code switches, each determining one bit of the binary code indicative of actuation of each of the pushbuttons. One such code switch is indicated at 67. Each of the code switches is actuated by means of an overtravel mechanism, such as at 69, described hereinbelow. The remaining two switches constitute so-called strobe switches which are positioned so that they are adapted to be actuated subsequent to actuation of any of the code switches upon actuation of a pushbutton. As will appear, one of the strobe switches is actuated by depression of numeral pushbuttons and the other by depression of letter pushbuttons. The strobe switches indicate the previous actuation of the code switches and may be connected with circuitry to cause "reading" of the code switches, as is conventional. A typical strobe switch is indicated at 71 and is actuated by means of a snap disc arrangement including a bushing 73 and which is described below.

The code and strobe switches are each preferably sensitive snap-action button-actuated switches. Such switches providing extremely high reliability are commercially available. Single-pole double-throw types of such switches may be employed. The lower and upper enclosure halves 37 and 39 each includes six arcuate channels which, when the halves are secured together, snugly confine these switches, those channels such as 75 and 77 in lower enclosure half 37 and such as 79 and 81 in upper enclosure half 39 being of greater size than the other channels in order to accommodate the larger strobe switch assemblies. Exemplary code switch channels are illustrated at 83 in the lower half and at 85 in the upper half.

Actuation of the code and strobe switches by plates A–F is by means of respective tabs 87A–87F at the edges of the plates. There being a switch for each of plates A–F, the switches may be regarded as the A-switch, the B-switch and so on. Code switch 67 is, accordingly, the A-switch since the tab 87A of plate A is aligned with that switch. Similarly, strobe switch 71 may be regarded as the F-switch, inasmuch as tab 87F of plate F will actuate the latter switch. Leads such as indicated at 35 in FIG. 2 are connected to the terminals of the switches to permit interconnection with appropriate external circuitry.

Figure 5A:
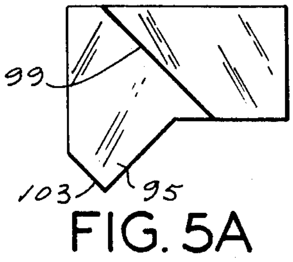
FIGS. 5A–5C are side, end and bottom elevations, respectively, of a cam which is one of a pair used as an expander means of the invention and as depicted in FIG. 3 assembly.
Figure 5B:
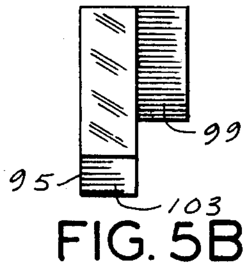
Figure 5C:
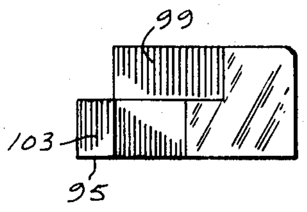
Figure 8:
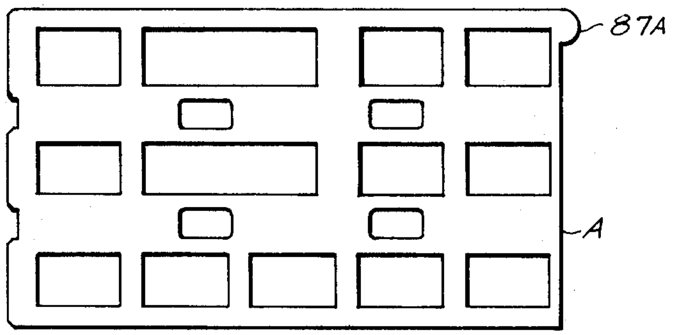

FIGS. 4A–4D depict a pushbutton such as that at 41 in FIG. 3, from various aspects. One of the pair of identical cams cooperative with the pushbutton is similarly illustrated in FIGS. 5A–5C. A suitable material for the pushbuttons as well as the cams is Nylon. Other types of materials having high strength and self-lubricating qualities are also suitable.

The pushbutton has a lip 89*a*, 89*b* extending from each side thereof at one end to prevent the button from falling out of the aperture in the upper enclosure half through which aperture it is actuated. Depression of the pushbutton is actuated by pressure applied from the opposite end to a surface 91. A recess generally indicated 93 at the end between lips 89*a*, 89*b* is provided for accommodating a projection 95 of a cam, such projections of the pairs of cams being side-by-side within recess 93 in a button-and-cam assembly. The pushbutton has a pair of oppositely oriented surfaces 97*a*, 97*b* on opposite sides of recess 93 and each is inclined at approximately 45°with respect to the direction of sliding movement of the slider plates, in an assembled keyboard, as well as with respect to the direction of movement of the pushbutton upon being depressed.

Figure 6:
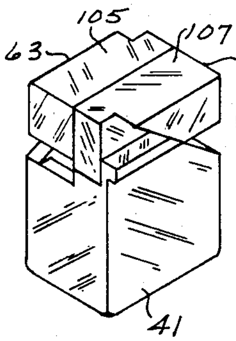
FIG. 6 is a perspective of a pushbutton-and-cam assembly showing the cams in a first position.
Figure 7:
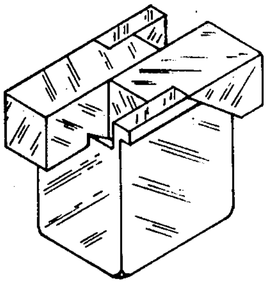
FIG. 7 is a perspective illustrating the FIG. 6 assembly with the cams in a second and expanded position.

Each of the cams includes an identically inclined surface 99 by means of which the cam rides on the surface 97*a* or 97*b*, as appropriate, of the pushbutton. The pushbutton is also provided with oppositely oriented inclined surfaces 101*a*, 101*b* which extend inwardly toward each other, each again being inclined, like surfaces 97*a*, 97*b* at 45°. The projection 95 of the cam includes an identically inclined surface 103 which rides on surface 101*a* or 101*b*, as appropriate. The resultant button-and-cam assembly is depicted in FIGS. 6, and 7, the button being the button 41 with its corresponding cams 63 and 65, shown in FIG. 3.

The dimensions of the pushbuttons and cams are such that when the pushbutton is in its retracted (i.e., when not depressed) position, the cams, e.g., cams 63 and 65, are in the position shown with each having a respective surface 105, 107 bearing against the smooth inner surface of lower enclosure half 37. When pushbutton 41, for example, is depressed, the pressure against the respective surfaces 105 and 107 of the cams causes the cams to be forced from the position seen in FIG. 6 along the inclined surfaces of the pushbuttons, e.g., surfaces 97*b* and 101*b* as viewed in FIGS. 4A–4D, in opposite directions and outwardly with respect to the axis of movement of the pushbutton as it is actuated, until the cams come to rest in the position shown in FIG. 7. Thus the cams have effected an expansion, as mentioned previously, to a predetermined dimension.

The apertures of the slider plates each has a dimension along the expansion axis of the cams substantially equal to this predetermined dimension, whether the aperture be normally eccentric or concentric with respect to the cams accommodated by that aperture. The apertures are shown clearly in FIGS. 8–14 which are respective plan views of plates A, C, B, D, E, F and G, in that order, as the plates appear when looking from the front surface of the keyboard, as in FIG. 1.

Figure 9:
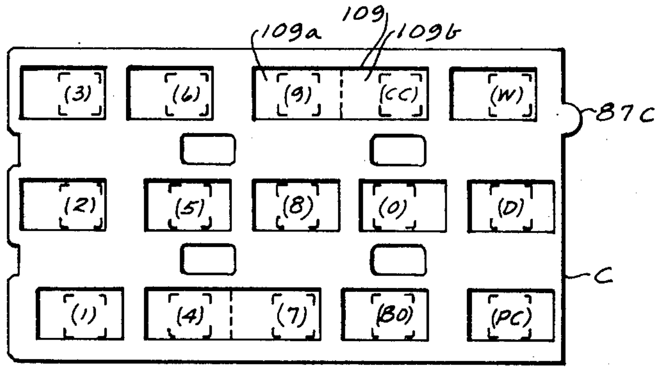
Figure 10:
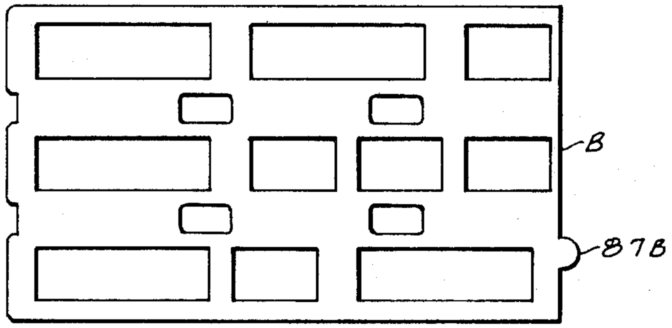
Figure 11:
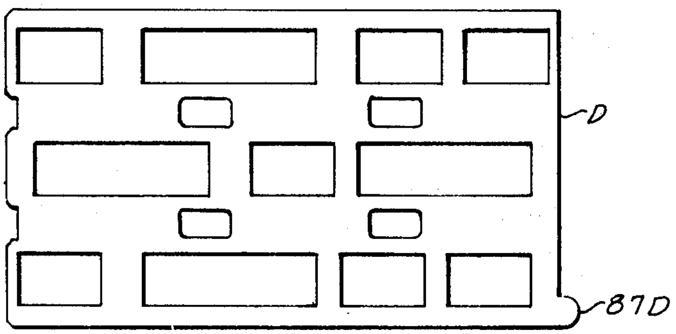
Figure 12:
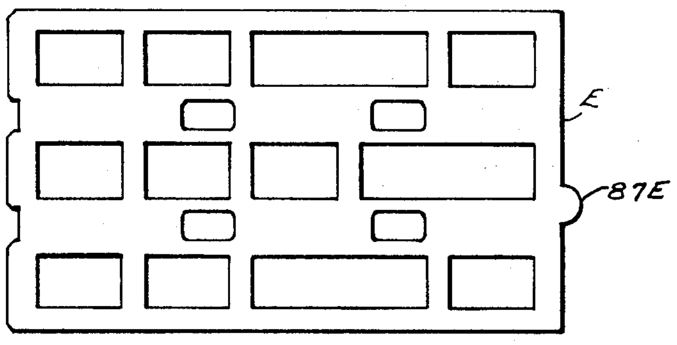
Figure 13:
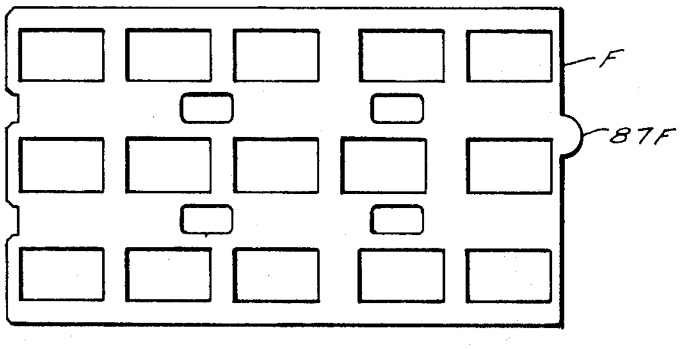
Figure 14:
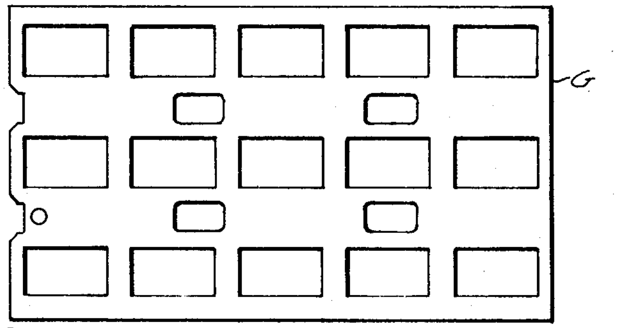

While plates A–G are different from each other in having different preselected apertures positioned eccentrically, i.e., offcenter, with respect to the pair of cams through the respective apertures, understanding them may be facilitated by referring to FIG. 9, which shows plate C. There, small tick-marks have been a, to and indicate approximately the dimensions of each rectangular pushbutton-and-cam assembly extending through each aperture when each pushbutton is in its retracted position i.e., not actuated. The location of each button is shown by the appropriate numeral or letters in parentheses.

Before noting the differences between eccentric and concentric apertures, it should be noted that some of the apertures are, in effect, double apertures. Such double apertures are indicated at 109 and 111. These should be regarded for the purpose of this disclosure as being two distinct apertures, such as 109*a*, 109*b* and 111*a*, 111*b*, but having no separation therebetween. Dotted lines are shown to indicate the division between the individual apertures of such double apertures. Other plates have similar double apertures. They are used to effect an advantageous overall reduction in the length of the plates.

With the foregoing in mind, it may be noted that the apertures are eccentric with respect to the cams associated with the following pushbuttons: 2, 6, 7, BO, CC and W. The remaining apertures are concentric, i.e., those associated with the following pushbuttons: 1, 3, 4, 5, 8, 9, 0, PC and D. Thus it may be seen that actuation of any of the former pushbuttons, for example, the "2" button, will cause movement of plate C to the right with accompanying actuation of the C-switch by the switch-actuating tab 87C of this plate. However, depression of one of the latter set of pushbuttons, for example, the "PC" button, will lock plate C in position, i.e., prevent it from sliding to the right. Similar considerations apply to each of plates A–F. Plate G, however, has a different use and is discussed more fully below. It should be observed that every one of plates A–F has both concentric an eccentric apertures. The arrangement is such that when one of the plates has been locked into position (i.e., as to which sliding movement is prevented), for every other pushbutton-and-cam assembly there will be an eccentric aperture in one of the plates A–F which prevents actuation of any other pushbutton than that which has previously been actuated, providing interlocking of the pushbuttons as previously mentioned.

FIGS. 15 and 16 illustrate a strobe switch and snap disc arrangement, and an overtravel mechanism, both previously briefly mentioned. The code switches are preferably similar to the strobe switch 71 shown in FIG. 15. The latter switch includes a threaded extension 113 on which is threaded an annular bushing 115. An actuating button 117 protrudes from extension 113. Secured in the mouth of bushing 117 is a snap disc 119 shown in its normal position with its center in contact with button 117. As described previously, each of the strobe switches is adapted to be actuated subsequent to actuation of the code switches. Depression of each respective pushbutton actuates one of the strobe switches. Each includes the snap disc arrangement illustrated. Hence the snap disc, which is but one of various possible overcentering means, snaps to actuate the strobe switch upon actuation of any of the pushbuttons in response to the resultant sliding movement of the respective slider plate with which the strobe switch is associated. This provides an advantageous tactile snap-action sensation upon actuation of a pushbutton.

Since the code switches (which are similarly button-actuated) must be actuated prior to actuation of a strobe switch, the overtravel mechanism shown in FIG. 16 is positioned (as shown in FIG. 3) between each of the code switches and the slider plate with which the code switch is associated to permit continued sliding movement of the respective slider plate after the code switch has been actuated, noting that it is during this continued movement that the appropriate strobe switch is actuated. The overtravel mechanism includes a shallow tubular shell indicated generally 121, having a flat closed end 123 which the tab 117A–D of the respective plate engages. A similar tubular plunger indicated generally 125 is slidable axially within shell 121, and also having a flat closed end 127 which bears against the actuation button of the respective code switch. A compression spring 129 biases the shell and plunger apart with a compressive force somewhat greater than that required to effect actuation of the respective code switch. A ring 131 encircles the plunger where it is secured as by crimping the edge of shell 12 so as to engage a flange 133 of plunger 125 such that the latter is slidably captive within shell 121.

Operation of the present embodiment can more easily be understood by referring to FIGS. 17–19 wherein partial sections have been taken through the keyboard to show operation of the "7" and "BO" pushbuttons and the E-switch and these are designated accordingly. Plates A–F are shown positioned between the respective inner faces 137 and 139 of the lower and upper enclosure halves 37 and 39.

FIG. 17 shows the position of the components of the keyboard when none of the pushbuttons, including "7" and "-BO" buttons, is actuated. As to the "7" button, it may be seen that plates C, B, D and F are eccentric with respect to the pair of cams, designated 141 and 143, associated with the "7" button, plates A, 13 and E accordingly being concentric. The aperture in preload plate G is positioned to be concentric with respect to the pair of cams 141 and 143 if it were not for the biasing action of spring 49 (FIG. 3) which biases plate G toward the right as viewed in FIGS. 17–19, which causes the left-hand edge of the plate G aperture at "7" button to be urged against cam 141, thus tending to make the apertures of plate G eccentric with respect to the pairs of cams therethrough. The same is true for the plate G aperture at the "BO" pushbutton. The cams associated with the latter are designated 145 and 147.

As to the latter pair of cams, i.e., cams 145 and 147, apertures in plates C, D an E are eccentric, apertures in plates A, B and F being concentric. Accordingly, each of plates A–F is in its retracted position as may be seen to the left of the snap disc assembly of the E-switch. However, tab 87E of plate E is visible in this section, other tabs not being visible.

On depressing of the "7" pushbutton as indicated by the arrow in FIG. 18, those slider plates having apertures eccentric with respect to the pair of cams 141, 143 associated with the "7" pushbutton are centered or pushed to the right by the centering or expansion action of the cams. These plates, viz, plates C, B, D and F, are caused to move to their extended positions, as may be observed at the left of the snap disc. Accordingly, the C-, B- and D-switches, which are code switches, are actuated, and the F-switch, a strobe switch, is also actuated (none of these switches being visible in FIGS. 17–19). This also causes the apertures of plates B and F at pushbutton "BO" to be made eccentric, preventing the latter from being actuated. Upon release of the "7" pushbutton, the inherent spring forces of the C-, B-, D-, and F-switches return the plates to the retracted position and thus, together with the biasing action of preload plate G, cause the "7" pushbutton to return to its unactuated, retracted position as in FIG. 17.

Similarly, if the "BO" pushbutton is depressed as indicated in FIG. 19, cam 147 causes plates C, D and E to be shifted to the right to their extended positions, whereby causing actuation of the C- and D-switches (code switches) and subsequent action of the strobe E-switch through overcentering of the snap disc by pressure from tab 87E. Movement of cam 145 to the left blocks any sliding movement of plates E and F; hence the "7" pushbutton is prevented from being depressed. Upon release of the "BO" pushbutton, the c- and d-switches bias plates C and D to the retracted position. This action, aided by the biasing action of plate G, returns the "BO" pushbutton to the unactuated position as in FIG. 17. From the foregoing, it may be seen that preload plate G acts to prevent any of the pushbuttons from so-called slouching due to inherent lost motion in the actuating mechanism resulting from tolerances in dimensions and also tends to make the depression force constant as to all of the pushbuttons.

To further illustrate the operation of the present embodiment, the table shown in FIG. 20 indicates which of each of the switches is actuated (indicated by an X) as each pushbutton is depressed. The D-switch may be assumed to represent the first binary digit position, the C-switch thus representing the second position, the B-switch representing the third binary digit position and the A-switch representing the fourth position. Accordingly, the pushbutton numerals 1–9 are seen to result in a true binary progression: 0001, 0010, 0011, et cetera. Each of the pushbuttons representing a numeral actuates the F-switch for strobing. The numeral '0" is represented only by actuation of the F-switch. The letters D, W, BO, PC and CC are represented by binary equivalents of 1, 2, 3, 5 and 6, respectively, with the E-switch being instead actuated for strobing. Codes other than binary may be used, such as the Gray code.

Referring now to FIG. 21, there is shown a further keyboard embodiment of the invention indicated generally at 151 and having a single column of 10 pushbuttons designated with numerals 0–9 from bottom to top. A window 153 is provided at the top end of an enclosure 155 from which the pushbuttons protrude. The purpose of window 153 is to provide a visual indication of the character represented by each of the pushbuttons. The "2" pushbutton is shown depressed and the numeral 2 appears in window 153.

This embodiment utilizes the same type of mechanism of the previously described multiple column-and-row keyboard and includes a stack array of flat, relatively thin slider plates each having a plurality of apertures, with each such aperture having a corresponding aperture in each of the other plates. Only the end portions of such plates are shown to simplify illustration. In FIG. 22, the end portions of the slider plates are shown in cross section and are designated 157A–157G.

As in the previous embodiment, there is an aperture centering means (such as the previously described cam arrangement) associated with each of the ten pushbuttons. Each such centering means extends through one aperture in each of the plates and its operation is such as to cause centering of the aperture through which the centering means extends in response to actuation of the pushbutton through which it extends.

The plates each have a retracted position in which preselected ones of the apertures are offcenter with respect to the centering means extending therethrough. For example, plates 157B and 157E are shown in the retracted position. Of course, remaining apertures are centered with respect to their respective centering means.

The plates are each guided by enclosure 155 for sliding movement along the longitudinal axis of the keyboard to an extended position, i.e., toward the top of the keyboard (to the right in FIG. 22,) in response to the centering of an aperture by a respective centering means. Plates 157A, 157C, 157D, 157E and 157G are shown in extended positions.

Preferably at least those positions of the slider plates which are shown in FIG. 22 have high light transmissivity. For example, they may be of a transparent synthetic resin material. Shown positioned below these end portions of the plates is a thin sheet 159 of similar transparent material providing support for the plates. Beneath sheet 159 is a suitable light source such as the bulb 161 shown.

Positioned above the plates is a character mask 163 shown in FIG. 24. Mask 163 has generally low-light transmissivity (e.g., it may be opaque) except for a figure-eight pattern defined by seven character segments designated **165*a*–165*g***, each constituted by a repeated bar pattern of small separate and evenly spaced areas or diagonal bars of relatively high light transmissivity (e.g., each such area may be transparent).

Each of plates 175A–157G includes a repeated-bar pattern of low-light transmissivity which corresponds to and is substantially identical with the pattern for each of segments **165*a*–165*g* of mask 163. These slide patterns are shown in FIGS. 24A–24G (which are respective plan views of the ends of slides 157A–157G) and are designated 167*a*–167*g*. Preferably, they may be opaque as indicated. Each one of the segment patterns 167*a*–167*g*** is positioned so that when the respective plate 157A–157G is in the retracted position, there is exact registry with the corresponding segment of mask 163 for blocking off passage of light through this segment of mask 163. When the respective plate 157A–157G moves to the extended position, the pattern on that plate moves out of registry to permit light to be directed through the corresponding segment of mask 163. Accordingly, the segments through which the light is directed are indicative of a character represented by each of the pushbuttons. Of course, switches or other means may be responsive to movement of either the pushbuttons or the slider plates, as in a calculating device using this embodiment.

As may be seen, the numeral 2 appears in window 153 with plates 157A, 157C, 157D, 157E and 157G in the extended position shown. Each of the numerals 0–9 is similarly visually indicated. For example, the numeral 7 is indicated by permitting light to pass through segments 165*e*, 165*g* and 165*f* of mask 163. The patterns on mask 163 and the seven slides may be provided by conventional photomask techniques.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim is:

1. A selector keyboard comprising:

a set of selectors each movable in one direction from a retracted to an operative position;

a set of slider plates arranged in a stack with each plate in a plane generally perpendicular to said direction, each plate being slidable between a retracted and an operative position;

a plurality of pusher means, one for each selector, each operable by the respective selector for effecting pushing of at least one plate from its retracted to its operative position;

each plate having a plurality of apertures therein accommodating said pusher means, there being a set of apertures for each pusher means comprising an aperture in each plate;

at least one aperture in each of said sets being so shaped and so disposed when the respective plate is in its retracted position that, on operation of the respective pusher means, the respective plate is pushed from its retracted to its operative position; the other apertures in each set being so shaped and so disposed when the respective plates are in their retracted position that, on operation of the respective selectors, the respective pusher means are idle without pushing the respective plates.

2. A selector keyboard as set forth in claim 1 wherein each of said pusher means comprises aperture centering means, extending through each of the apertures in said set of apertures for each pusher means, for causing centering of the aperture through which the respective centering means extends, thereby effecting said pushing of the respective plate, said at least one aperture in each of said sets being offcenter with respect to the centering means through the respective aperture when the respective plate is in its retracted position, said other apertures in each set being centered with respect to the centering means through the respective aperture when the respective plate is in its retracted position.

3. A selector keyboard as set forth in claim 1, said selectors each comprising a pushbutton which is moved to an operative position when depressed.

4. A selector keyboard as set forth in claim 1 further comprising electrical switch means associated with each plate and responsive to pushing of the respective plate from its retracted to its operative position thereby to provide an encoded indication of operation of each of the selectors.

5. A selector keyboard as set forth in claim 1 wherein said set of selectors is constituted by a plurality of rows of individual selectors.

6. A pushbutton keyboard assembly comprising:

a plurality of pushbuttons;

a stack array of slider plates each having a plurality of apertures, each aperture in each one of the plates having a corresponding aperture in each of the other plates;

aperture centering means associated with each of said pushbuttons, each centering means extending through one aperture in each of the plates and being operative in response to actuation of the associated pushbutton for causing centering of the aperture through which the respective centering means extends, the plates each having a retracted position in which preselected ones of said apertures are offcenter with respect to the respective centering means extending therethrough, apertures other than said preselected ones being centered with respect to their respective centering means;

means for guiding the plates for sliding movement from said retracted position to an extended position in response to centering of an aperture by a respective centering means; and means responsive to sliding movement of each of the plates to the extended position for indicating such sliding movement thereby to provide a discrete encoded indication of the actuation of each respective pushbutton.

7. A pushbutton keyboard assembly as set forth in claim 6 wherein said pushbuttons each includes at least one surface inclined with respect to the direction of sliding movement of said plates and wherein each of said aperture centering means comprises cam means riding on said inclined surface, the cam means being cammed in a direction aligned generally with the direction of sliding movement of said plates to cause centering of an aperture through which the cam means extends.

8. A pushbutton keyboard assembly as set forth in claim 6 wherein each of said plates is in a plane generally perpendicular to the direction of movement of each of the pushbuttons when actuated.

9. A pushbutton keyboard assembly as set forth in claim 6 wherein said pushbuttons are arranged in a plurality of rows thereof.

10. A pushbutton keyboard assembly as set forth in claim 6 wherein said plates are fewer in number than said pushbuttons.

11. A pushbutton keyboard assembly as set forth in claim 6 wherein the means responsive to sliding movement of each of the plate is constituted by an electrical switch for each of the plates, each of the switches being actuated when the respective plate is in the extended position.

12. A pushbutton keyboard assembly as set forth in claim 11 wherein a plurality of the switches constitute code switches each of which, when actuated, determines one bit of a binary code indicating the actuation of each of the pushbuttons.

13. A pushbutton keyboard assembly as set forth in claim 12 wherein at least one of the switches constitutes a strobe switch adapted to be actuated subsequent to actuation of any of the code switches whereby upon actuation of a pushbutton said strobe switch will be actuated thereby indicating previous actuation of the code switches.

14. A pushbutton keyboard assembly as set forth in claim 6 wherein the means responsive to sliding movement of each of the plates comprises a character mask comprising character segments each constituted by areas of relatively high light transmissivity, and means for directing light through said character mask, said plates each including means for blocking off at least one of the segments when the plate is in its retracted position and for permitting said light to be directed through said at least one of the segments when the plate is in its extended position, whereby segments through which said light is directed visually indicate a character represented by each of the pushbuttons.

15. A pushbutton keyboard assembly comprising:

a plurality of pushbuttons;

respective means associated with each of the pushbuttons for expanding, in response to actuation of the respective pushbutton, to a predetermined dimension along an axis generally perpendicular to the direction of movement of the pushbuttons when actuated;

a stack array of slider plates each lying in a plane generally perpendicular to the direction of movement of the pushbuttons when actuated, the plates each having a plurality of apertures, each expander means extending through one aperture in each of the plates, each aperture having a dimension along the expansion axis of any of the expander means substantially equal to said predetermined dimension, each plate having a retracted position in which preselected ones of said apertures are eccentric with respect to the respective expander means, the eccentricity being along the expansion axis, apertures other than said eccentric apertures each being concentric with respect to the respective expander means; means for guiding each of the slider plates for sliding movement from the retracted position to an extended position along the expansion axis, whereby actuation of an individual pushbutton will cause centering of eccentric apertures by expansion of the respective expander means, thereby causing sliding movement to the extended position of any of the slider plates having an aperture eccentric with respect to the expander means associated with the individual pushbutton and whereby expansion of the respective expander means will prevent sliding movement of any of the slider plates having an aperture eccentric with respect to the expander means associated with the individual pushbutton; and means responsive to sliding movement of each of the slider plates to the extended position for indicating said sliding movement thereby to provide a discrete encoded indication of the actuation of each of the pushbuttons.

16. A pushbutton keyboard assembly as set forth in claim 15, there being an eccentric aperture in one such slider plate as to which sliding movement is prevented upon actuation of an individual pushbutton for every expander means other than the expander means associated with the individual pushbutton actuated whereby to prevent actuation of any other pushbutton is prevented when the individual pushbutton is actuated, the pushbuttons thereby being interlocking.

17. A pushbutton keyboard assembly as set forth in claim 16 wherein each of the pushbuttons includes a pair of oppositely oriented surfaces each inclined with respect to the direction of sliding movement of said plates, each of the respective expander means comprising a pair of cams each riding on one of the inclined surfaces, said cams being forced along said inclined surfaces in opposite directions and outwardly with respect to the axis of movement of the pushbuttons when actuated, each of the pairs of cams being adapted to engage opposite sides of an aperture through which the pair of cams extends.

18. A pushbutton keyboard assembly as set forth in claim 17 comprising a further plate slidable along the expansion axis and having an aperture for each of the pairs of cams through which the pair of cams extends, each aperture in said further plate being positioned for being concentric with respect to the pair of cams extending therethrough for one position of said further plate and having a dimension along the expansion axis substantially equal to said predetermined dimension, and means urging said further plate in one direction along the expansion axis to make the apertures thereof eccentric whereby said pushbuttons are biased against actuation.

19. A pushbutton keyboard assembly as set forth in claim 16 wherein said pushbuttons are arranged in columns and rows.

20. A pushbutton keyboard assembly as set forth in claim 16, said slider plates each being relatively thin and substantially flat.

21. A pushbutton keyboard assembly as set forth in claim 16 wherein said plates are fewer in number than said pushbuttons, and wherein the means responsive to sliding movement of each of the plates is constituted by an electrical switch for each of the plates, each of the switches being actuated by movement of the respective plate to the extended position.

22. A pushbutton keyboard assembly as set forth in claim 21 further comprising overcentering means associated with at least one of said switches for overcentering in response to movement of the respective plate to the extended position to actuate the last said one of the switches, thereby providing a tactile snap-action sensation upon actuation of a pushbutton.